United States Patent [19]

Becker et al.

[11] 4,329,992

[45] May 18, 1982

[54] MEDICAL APPARATUS FOR PARENTERAL LIQUIDS

[75] Inventors: Udo Becker, Marburg an der Lahn; Wolfram Busch, Hochheim am Main; Johann P. Fischer, Königstein; Werner Sommer, Bad Soden am Taunus, all of Fed. Rep. of Germany

[73] Assignee: Hoechst Aktiengesellschaft, Frankfurt am Main, Fed. Rep. of Germany

[21] Appl. No.: 138,553

[22] Filed: Apr. 8, 1980

[30] Foreign Application Priority Data

Apr. 10, 1979 [DE] Fed. Rep. of Germany ....... 2914463

[51] Int. Cl.³ .............................................. A61J 1/00
[52] U.S. Cl. ............................ 128/272; 128/DIG. 24
[58] Field of Search ............... 128/214 R, 214 D, 348, 128/349, 272; 3/1; 428/520, 516

[56] References Cited

U.S. PATENT DOCUMENTS 3,697,311  10/1972  Aleckner et al. ................... 428/516
4,132,857  1/1979  Scarola et al. ...................... 428/520

OTHER PUBLICATIONS

"Fatty Acids", *Encyclopedia of Chem. Tech.*, 2nd Edition, Wiley 1965, p. 845.

Primary Examiner—Robert W. Michell
Assistant Examiner—T. J. Wallen
Attorney, Agent, or Firm—Curtis, Morris & Safford

[57] ABSTRACT

Medical apparatus for parenteral liquids wherein at least the surfaces coming into contact with said liquids consist of or contain a chlorinated polyolefin as specified and additionally contain a glycerol ester of an aliphatic fatty acid. The apparatus is characterized by a very good blood tolerance.

9 Claims, No Drawings

MEDICAL APPARATUS FOR PARENTERAL LIQUIDS

For the collection, storage and administration of parenteral liquids such as blood, blood plasma, blood substitutes, infusion solutions and other physiological liquids containers made from plasticizer-containing polyvinyl chloride are used. It is known that the plasticizer contained in the plastic material involves the risk of migration or extraction. This phenomenon is described, for example, in DE-AS No. 2,502,182. It is also known that plasticizer-containing polyvinyl chloride, frequently used silicone material and conventionally processed polyolefins damage the blood or blood constituents coming in contact therewith by activating or adsorbing various cellular and plasmatic factors of the coagulation system. Hence, medical apparatus made from such materials can be used to a limited extent only. This limited capability is equally applicable to medical apparatus, esspecially bags for blood made of polyurethane because of their high permeability for water vapor and air. In addition, polyurethane is relatively difficult to process rendering the manufacture of some medical apparatus rather complicated.

It is, therefore, an object of the present invention to provide medical apparatus made from a plastics material which is free from the known disadvantages and especially which has an improved tolerability for blood.

According to the present invention this problem is solved by using medical apparatus having a plastics material consisting of or containing a chloropolyolefin, which material further contains as additive glycerol esters of aliphatic fatty acids.

The invention therefore relates to medical apparatus for containing parenteral liquids wherein at least the surfaces coming into contact with said liquids are made from a chlorinated polyolefin or a plastics material containing at least 50 parts by weight thereof for 100 parts by weight of total polymer—with the exception of a plastics material consisting of 50 to 95.5 parts by weight of chlorinated polyolefin having an average molecular weight of from 30,000 to 300,000 and 0.5 to 50 parts by weight of polymers of acrylic and/or methacrylic acid esters—said chlorinated polyolefin having a chlorine content of 15 to 45% by weight and an average molecular weight $\overline{M}_w$ of 20,000 to 2,000,000 (weight average calculated from the chlorine content and the molecular weight of the starting polyethylene determined by gel chromatography; calibrated with polyethylene standards of the National Bureau of Standards, Washington D.C.), said polymer containing 0.01 to 10 parts by weight of glycerol esters of aliphatic fatty acids for 100 parts by weight of polymer.

Suitable chlorinated polyolefins preferably used according to the invention for medical apparatus are the known chlorination products of polyolefins, especially of polyethylene, polypropylene and copolymers of ethylene and propylene, more particularly high density polyethylene and copolymers of ethylene with minor proportions, for example 1 to 5 mol %, of propene, butene-1 or hexene-1. The average molecular weight $\overline{M}_w$ of the chlorinated polyolefins is preferably in the range of from 70,000 to 400,000 with a chlorine content of 25 to 40% by weight. The water vapor permeability of the compositions is influenced inter alia, by the crystallinity of the chloropolyolefins and, therefore, chlorinated polyolefins having a residual crystal content of 0 to 20, more preferably 0 to 15%, determined by differential thermoanalysis, are preferred. It is also possible to use mixtures of several chloropolyolefins.

The polyolefins used for the chlorination preferably have a reduced specific viscosity (RSV), measured in a 0.1% solution in decahydronaphthalene at 135° C. according to ISO/R 1191, of 0.5 to 35, preferably 1.2 to 5 dl/g. If polyolefins having a higher RSV value and thus a higher molecular weight are used for the chlorination, thermoplastic compositions are obtained which are difficult to process, whereas polyolefins having a lower RSV value give compositions with poorer mechanical properties. In principle, the combinations of chloropolyolefins or of plastics materials containing the same with glycerol esters of aliphatic fatty acids also exhibit effectiveness with polymers of lower and higher molecular weights. However, with high molecular weight materials it is necessary to change from thermoplastic processing to other processing methods, for example to sintering. In general, the average molecular weight $\overline{M}_w$ is in the range of from 15,000 to 1,500,000, preferably 50,000 to 300,000 and the polydispersity $(\overline{M}_w/\overline{M}_n)$ (weight average/number average) is in the range of from 2 to 20, preferably 4 to 15.

The polyolefins are chlorinated by any known process, preferably in aqueous suspension, for example by the process of DE-AS No. 1,420,415, or in dilute hydrochloric acid in the presence of agglomeration inhibitors as described in DE-OS No. 2,260,525.

The plastics material to be used according to the invention can contain, in addition to at least 50% by weight of chlorinated polyolefin, other polymers or copolymers the molecular weight of which is preferably within the range indicated above for the chloropolyolefins.

Materials of this type are the known polymers capable of being mixed with chloropolyolefins—with the exception of polyacrylic or polymethacrylic acid esters—or copolymers provided that they do not consist preponderantly of acrylic and/or methacrylic acid esters and do not contain vinyl chloride as comonomer. Suitable polymers of this type are polyvinyl chloride, polyolefins such as polyethylene or polypropylene, polyvinyl acetate and polyacrylonitrile.

The copolymers preferably contain vinyl chloride, olefins, especially ethylene or propylene, diolefins such as butadiene, isoprene or ethylidene-norbornene, vinyl esters such as vinyl acetate, or acrylonitrile as monomer units. Examples of copolymers are vinyl chloride copolymers such as vinyl chloride/ethylene or vinyl chloride/vinyl acetate copolymers, ethylene/vinyl acetate copolymers, ethylene/propylene copolymers (EPR), ethylene/propylene/diolefin terpolymers (EPTR), acrylonitrile/butadiene copolymers (NBR) and acrylonitrile/butadiene/styrene terpolymers (EBSR).

In the case of a plastics material of a chloropolyolefin and another polymer being used, this material can be obtained by mixing the respective polymers, preferably in the melt. A better homogenization and generally a better transparency of the material can be obtained by polymerizing the respective monomer or monomer mixture in the presence of the chlorinated polyolefin under known polymerization conditions. In this case the monomer(s) are grafted to a certain extent on the chlorinated polyolefin.

The contents and compositions of the aforesaid plastics materials depend on the intended use of the medical apparatus and the required utilitarian properties such as mechanical stability, flexibility, transparency, gas permeability and capability of being sterilized.

To ensure that the materials having the required utilitarian properties are compatible with blood or blood constituents, especially on the surface of the apparatus in contact with said substances, glycerol esters of aliphatic fatty acids are added, preferably in an amount of from 0.5 to 5 parts by weight for 100 parts by weight of polymer.

The glycerol esters contain as acid component saturated or unsaturated fatty acids having from 5 to 30 carbon atoms and are preferably fats and oils occuring in nature, for example soybean oil, or epoxidation products of such fats and oils having an epoxide oxygen content of up to 10% by weight, preferably 2 to 7% by weight, for example epoxidized soybean oil.

The glycerol esters are blended with the plastics material in pure form or in the form of mixtures as occuring in nature in a melt mixing process prior to shaping or they are applied after shaping onto the surface of the respective apparatus facing the parenteral liquid.

In the latter case, small amounts, for example 0.01% by weight of the glycerol esters are sufficient. When incorporating by melt mixing, especially in the granulation of the plastics material in general 0.1 to 10 parts by weight, preferably 0.5 to 5 parts by weight of the glycerol esters of aliphatic fatty acids are required.

It is essential that at least surface of the medical apparatus coming into contact with the parenteral liquid consists of the material to be used according to the invention, i.e. a polymer as specified above containing the special additive.

The term "surface" preferably means a zone down to a depth of about 5 μm, preferably 1 μm, although an antithrobogenic finishing down to a surface depth of a few Angstrom according to the invention is generally sufficient.

Besides the above specified additive, which also acts as lubricant and stabilizer, further stabilizers that are physiologically acceptable can be contained in the polymer material, for example calcium, magnesium, aluminum and zinc salts of fatty acids, such as calcium-zinc stearate or calcium-aluminum stearate, organic phosphites and phenolic antioxidants. The polymer materials may further contain the usual light stabilizers, lubricants, pigments and fillers, for example barium sulfate as contrast medium for roentgenography. The aforesaid additives can be added during the manufacture of the thermoplastic material or thereafter.

The term "medical apparatus" is intended to include, above all, apparatus or parts thereof that come into contact with parenteral liquids directly or indirectly, for example blood bags, flexible containers for infusion solutions, infusion tubes, suction tubes, blood filters, cannulae, parts of artificial kidneys or of heart-lung machines. Parenteral liquids include blood, blood serum and blood constituents as well as all injectable solutions for medicinal purposes such as solutions of blood substitutes. The term "medical apparatus" also includes implants such as arteriovenous shunts, artificial arteries, heart bypass pumps, heart values, parts of heart pacemakers, catheters and artificial hearts.

The apparatus are produced by known processes such as molding, injection molding, extrusion and blow molding, on the usual processing machines, for example extruders and calanders.

In most cases the good mechanical stability of the material is sufficient for the intended purposes. In special cases, however, it is advisable to improve the mechanical stability by incorporation of supporting webs of inorganic or organic material, for example glass fibers or man made fibers, for example polyester or polyamide fibers. It is also possible to use laminates the inner skin of which coming into contact with the parenteral liquid consists of the molding composition according to the invention (having the function of a lining), while the outer skin consists of a highly resistant material which should preferably be transparent and impermeable to gas.

Up to now, preferably plasticizer-containing polyvinyl chloride, silicones or polyethylene have been used for the manufacture of the aforesaid medical apparatus, the compatibility with blood and important blood constituents of which is exceeded by the materials to be used according to the invention. The blood tolerance or non thrombogenicity is the property of a material to be neutral with respect to the coagulation systems contained in the blood, that is to say not to cause the formation of clots (thrombi). Generally, material foreign to the body affects the cellular as well as the plasmatic constituents of the blood. The influence on the coagulating factors II, IX, XI and XII is of special importance. They are normally determined by the method of Hardisty and Macpherson (cf. Thromb. Diath. Haemorrh., volume 7, page 215 (1962)).

The blood tolerance or non thrombogenicity of the plastics material to be used according to the invention and of the apparatus made therefrom is determined by a series of tests the results of which, taken together, give evidence of the blood tolerance. The plastics material to be tested is used in the form of a flexible tube (rotary tube test). In the tests human whole blood is used, to which 10% by volume of a 3.8% by weight aqueous sodium citrate solution has been added. The tube has a length of 75 cm and an internal diameter of 4 mm. 10 ml of blood are introduced into the tube and the ends thereof are tightly connected with each other. The tube is bent to a circle and fastened to a rotary plate having an inclination of 75°. The plate is rotated at an ambient temperature of 37° C. for 2 hours at a rate of 15 rpm. When the rotary tube test is terminated, the number of thrombocytes in the test blood is counted with a commercial throbocytocrit (manufacturer Coulter Electronics Ltd.) and compared with the number of thrombocytes in the untreated blood. The thrombocyte retention (TR) found is listed in the Table. The cellular constituents of the blood are then removed by centrifugation (3,000 g, 20 min) and in the resulting blood plasma the following parameters are determined:

(a) platelet factor 3 (PF 3) according to Hardisty and Hutton, Brit. J. Haemat., volume 11, page 258, 1965;
(b) platelet factor 4 (PF 4) according to Harada and Zucker, Thromb. Dath. Haemorrh., volume 25, page 41, 1971;
(c) recalcification time (RCT): 0.2 ml of the plasma are admixed at 37° C. with 0.2 ml of an aqueous calcium chloride solution (0.025 molar) and the time until coagulation is determined in a commercial automatic coagulometer;
(d) partial thromboplastin time (PTT): 0.1 ml of a thromboplastin reagent (manufacturer Behringwerke AG) is added at 37° C. by a pipet to 0.1 ml of the plasma and the whole is incubated for 2 minutes. Next, 0.1 ml of an aqueous calcium chloride solution (0.025 molar) preheated to 37° C. is added and the time until coagulation is determined with a commercial automatic coagulometer.

(e) Coagulation factors II, IX, XI and XII.

In the following table all measured values are converted into the respective initial values of the untreated blood or plasma as standard value 1. The relative deviations from the initial values are summed up, the thrombocyte retention (TR) and the partial thromboplastin time (PTT) being doubled and divided by the number of measured parameters. The value obtained (measured number), expressed in percent, is a measure for the influence of the plastics material on the blood, the influence being the smaller the lower the value. The table reveals that tubes made from a combination of the invention, i.e. from chlorinated polyethylene and epoxidized soybean oil, have a blood tolerance (measured number) of 7.7%, calculated on the sum of the measured parameters, which is better than that of the unmodified chlorinated polyethylene (comparative Example A, measured number 24.1%), commercialized medical grade polyvinyl tubes with plasticizer and epoxidized soybean oil (comparative Example H, measured number 18.3%), commercialized medical grade silicone tube for blood transfusions (comparative Example G, measured number 25.9%), a polyethylene tube (comparative Example B, measured number 27.7%) and ethylene/propylene/ethylidene-norbornene terpolymer tube (comparative Example F, measured number 24.3%).

The following Examples illustrate the invention.

EXAMPLE 1

100 parts by weight of fine-grained chlorinated polyethylene having a chlorine content of 34% by weight, made from polyethylene of a weight average of 160,000 and a number average of 31,000 by chlorination (molecular weight determination of the starting polyethylene by gel permeation chromatography at 135° C. in 1,2,4-trichlorobenzene, calibrated with a polyethylene standard of the National Bureau of Standards, Washington D.C.) are blended in an agitator mill with 2 parts by weight of a stabilizer system consisting of calcium stearate and zink stearate, 0.15 parts by weight of a polyethylene wax as lubricant and 5 parts by weight of epoxidized soybean oil, and the blend is slowly stirred for 20 hours. The blend is melted and mixed in an extruder having a temperature program of 140° to 170° C. from the inlet to the die and the cooled extruded strand is chopped to granules. On a single screw extruder with a 30 mm screw and having the same temperature program (140° to 170° C.) a tube having an internal diameter of 4 mm and a wall thickness of 0.8 mm is extruded from the granules. Sections of 75 cm each of the tube are subjected without any further treatment to the blood tolerance test (rotary tube test) as described above. The test is repeated 10 times. With 25 blood coagulation tests altogether the measured number of blood tolerance is found to be 7.71±2.17% standard deviation or 0.43% of average error of the mean value.

EXAMPLE 2

A plastics composition is prepared as described in Example 1 with the exception that 2.5 parts by weight of the epoxidized soybean oil are used instead of 5 parts by weight thereof. The measured number of the blood tolerance is found to be 9,7%, in the repetion the value is 10.5%.

EXAMPLE 3

A plastics composition is prepared as described in Example 1 with the exception that 1.25 parts by weight of epoxidized soybean oil are used instead of 5 parts by weight thereof. The measured number of the blood tolerance is found to be 5.2%, in the repetion the value is 8.7%.

EXAMPLE 4

A plastics composition is prepared as described in Example 1 with the exception that 100 parts by weight of chlorinated polyethylene having a chlorine content of 39% by weight prepared from a polyethylene of a weight average $\overline{M}_w$ of 57,000 and a number average $\overline{M}_n$ of 13,000 by chlorination are used. The measured number of blood tolerance is found to be 4.0%, in the repetion it is 8.3%.

EXAMPLE 5

Under the conditions of Example 1, a polyethylene of $\overline{M}_w/\overline{M}_n$ of 220,000/30,000 chlorinated to a chlorine content of 34% is used. Measured value of blood tolerance 8.3%, in the repetion 11.5%.

EXAMPLE 6

Under the conditions of Example 1, 60 parts by weight of chlorinated polyethylene having a chlorine content of 34% by weight ($\overline{M}_w/\overline{M}_n$ of polyethylene 160,000/31,000) and 40 parts by weight of a chlorinated polyethylene having a chlorine content of 39% by weight ($\overline{M}_w/\overline{M}_n$ 57,000/13,000) are blended with 1 part by weight of epoxidized soybean oil. Measured number of blood tolerance 7.4%, repetion values 7.9% and 6.0%.

Comparative EXAMPLE A

Under the conditions of Example 1, the polyethylene is blended with 5 parts of epoxidized polyethylene wax having 30 carbon atoms in the molecule on the average and containing 2.6% by weight of epoxide oxygen (melting point 80° C.) are used instead of 5 parts of epoxidized soybean oil.

The measured number of blood compatibility as mean value of 4 different tube extrusions and 16 individual measurements of blood tolerance (cf. table) is found to be 24.1% with a standard deviation of ±9.4% or an average error of the mean value of 2.35%.

EXAMPLE 7

The tube produced without epoxidized soybean oil as described in comparative Example A is filled with epoxidized soybean oil and left to lie in rest position for 24 hours, whereupon the epoxidized soybean oil is allowed to flow out and the tube is dried under nitrogen. Content of soybean oil about 0.1% by weight, calculated on toatal tube. Measured number of blood tolerance as a result of 3 measurements 12.1±2.1%.

EXAMPLE 8

The tube produced as described in comparative Example A is treated with natural soybean oil (not epoxidized) as described in Example 7. Measured number of blood tolerance 8.7%.

Comparative EXAMPLE B

Under the conditions of Example 1, 100 parts by weight of polyethylene chlorinated to a chlorine content of 39% by weight ($\overline{M}_w/\overline{M}_n$ of polyethylene 57,000/13,000) are blended with 1.75% by weight of a stabilizer combination of calcium stearate and zinc stearate, 1.75% by weight of an epoxidized polyethylene wax, 0.24% by weight of a non epoxidized polyethylene wax and 0.15% by weight of oxystearic acid, the blend is melted and granulated, whereupon a tube is extruded therefrom. Measured number of blood tolerance average of 6 measurements 27.9±4.2%.

EXAMPLE 9

The tube of comparative Example B produced without addition of epoxidized soybean oil is filled with epoxidized soybean oil, stored for 24 hours and the epoxidized soybean oil is allowed to flow out. The tube is washed with hexane, dried under nitrogen and dried in a vacuum drier. Measured number of blood tolerance 10.4%/13.5%.

Comparative EXAMPLE C

Under the conditions of Example 1, 100 parts by weight of polyethylene chlorinated to a chlorine content of 34% by weight ($\overline{M}_w/\overline{M}_n$ of polyethylene 160,000/31,000) are blended with 0.5% by weight of calcium stearate, 1.5% by weight of barium-cadmium laurate and 0.5% by weight of trisnonyl phosphite, the blend is granulated and extruded to a tube. Measured

Comparative EXAMPLE F

A tube having the same dimensions as that of Example 1 is extruded from ethylene/propylene/ethylidene-norbornene rubber composed of 71% by weight of ethylene, 24% by weight of propylene and 5% by weight of ethylidene-norbornene. Measured number of blood tolerance according to the table from 17 individual measurements 24.3±1.7%.

Comparative EXAMPLE G

A tube having the same internal diameter of 4 mm as the tube of Example 1 but a wall thickness of 1 mm made from a medical grade silicone for biomedical application, for example for blood transfusions, is tested in the same manner. Blood tolerance number according to the table from 44 individual measurements 25.9±1.1%.

Comparative EXAMPLE H

A tube having an internal diameter of 4 mm and a wall thickness of 1 mm made from medical grade polyvinyl chloride containing 39% by weight of dioctyl phthalate as plasticizer and 5% by weight of epoxidized soybean oil for medical application, for example as commercialized for blood transfusions, is tested. The measured number of blood tolerance from 45 individual measurements is found to be 18.3±1.2%.

| | Mean factor variations in the determination of the blood tolerance measured numbers by the in vitro rotary tube system | | | | | |
|---|---|---|---|---|---|---|
| | | \multicolumn{6}{c}{Comparative Examples} | | | | | |
| Faktors | Example 1 25 * | A 16 * | E 9 * | F 17 * | G 44 * | H 45 * |
| (PR) × 2 | 0.946 ± 0.011 | 0.684 ± 0.036 | 0.519 ± 0.049 | 0.622 ± 0.032 | 0.634 ± 0.022 | 0.849 ± 0.048 |
| PF 3 | 1.060 ± 0.016 | 1.129 ± 0.017 | 1.100 ± 0.182 | 1.159 ± 0.035 | 1.169 ± 0.018 | 1.252 ± 0.027 |
| PF 4 | 1.125 ± 0.035 | 2.156 ± 0.191 | 2.206 ± 0.256 | 1.903 ± 0.176 | 2.133 ± 0.103 | 1.729 ± 0.115 |
| F XII | 1.025 ± 0.016 | 1.074 ± 0.028 | 1.017 ± 0.038 | 1.042 ± 0.023 | 0.947 ± 0.013 | 0.959 ± 0.012 |
| F XI | 1.012 ± 0.017 | 1.061 ± 0.030 | 1.060 ± 0.028 | 0.957 ± 0.042 | 0.958 ± 0.013 | 0.954 ± 0.024 |
| F IX | 0.991 ± 0.015 | 1.068 ± 0.051 | 1.013 ± 0.022 | 1.025 ± 0.035 | 0.908 ± 0.016 | 0.940 ± 0.016 |
| F II | 0.905 ± 0.012 | 0.926 ± 0.024 | 0.848 ± 0.031 | 0.888 ± 0.026 | 0.857 ± 0.002 | 0.853 ± 0.015 |
| RCZ | 0.957 ± 0.024 | 0.911 ± 0.037 | 0.824 ± 0.042 | 0.855 ± 0.037 | 0.871 ± 0.020 | 0.822 ± 0.031 |
| (PTT) × 2 | 1.066 ± 0.004 | 1.074 ± 0.008 | 1.084 ± 0.007 | 1.060 ± 0.037 | 1.112 ± 0.008 | 1.031 ± 0.056 |
| measured number (%) | 7.71 ± 0.43 | 24.1 ± 2.35 | 27.7 ± 3.4 | 24.3 ± 1.7 | 25.9 ± 1.1 | 18.3 ± 1.2 |

* number of tests number of blood tolerance 46.3±4.7% (from 4 measurements).

Comparative EXAMPLE D

The tube of Example 1 having a blood compatibility number of 7.71±0.43% as a result from 25 individual measurements is extracted internally with a mixture of 25% of toluene and 75% of methanol as solvent for the epoxidized soybean oil contained in the tube material, the toluene is washed out with methanol and the tube is dried. The loss in weight indicates that approximately one half of the epoxidized soybean oil has been extrated within 24 hours, Measured number of blood tolerance after superficial extraction of the epoxidized soybean oil 20.4±7.2%.

Comparative EXAMPLE E

A tube having the same dimensions as that of Example 1 is extruded from low density polyethylene ($\overline{M}_w/\overline{M}_n$ 72,000/18,000). Measured number of blood tolerance 27.7±3.4% (from 6 measurements).

What is claimed is:

1. An apparatus for containing a parenteral liquid which comprises a suitable base or support material having a surface layer affixed thereto wherein at least that portion of the surface layer coming into contact with the parenteral liquid is a polymer comprising at least 50 parts by weight of a chloropolyolefin having 15% to 45% by weight chlorine and an average molecular weight in the range of 20,000 to 2,000,000 and 0.01 to 10 parts by weight of glycerol ester of aliphatic fatty acids per 100 parts by weight of the polymer whereby said apparatus exhibits acceptable blood tolerance and non-thrombogenicity with respect to the contained parenteral liquid.

2. The apparatus of claim 1 wherein said surface layer comprises 100 parts by weight of chlorinated polyethylene having a chlorine content of 34% by weight, 2 parts by weight of a stabilizer consiting of calcium stearate and zinc stearate, 0.15 parts by weight of polyethylene wax lubricant and 5 parts by weight of epoxidized soybean oil.

3. The apparatus of claim 2 wherein said surface layer has a thickness of 1 $\mu$m to 5 $\mu$m.

4. The apparatus of claim 2 wherein the chlorinated polyethylene has a residual crystallinity of 0 to 15%.

5. The apparatus of claim 1 wherein the glycerol ester of aliphatic fatty acids is a natural fat or oil or the oxidation products thereof.

6. The apparatus of claim 1 wherein the glycerol ester of aliphatic fatty acids is epoxidized soybean oil.

7. The apparatus of claim 1 wherein said apparatus has a tubular configuration.

8. The apparatus of claim 1 wherein said base or support material is comprised of said polymer.

9. A method for containing a parenteral liquid in a suitable apparatus which comprises coating that portion of said apparatus coming into contact with the parenteral liquid with a polymer comprising at least 50 parts by weight of a chloropolyolefin having 15% to 45% by weight chlorine and an average molecular weight in the range of 20,000 to 2,000,000 and 0.01 to 10 parts by weight of glycerol ester of aliphatic fatty acids per 100 parts by weight of the polymer whereby said apparatus exhibits acceptable blood tolerance and non-thrombogenicity.

* * * * *